United States Patent
Volchegursky et al.

(10) Patent No.: US 8,819,620 B1
(45) Date of Patent: Aug. 26, 2014

(54) CASE MANAGEMENT SOFTWARE DEVELOPMENT

(75) Inventors: Dmitry Volchegursky, Pleasanton, CA (US); Aviv Rosenfeld, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 13/529,319

(22) Filed: Jun. 21, 2012

(51) Int. Cl.
*G06F 9/44* (2006.01)

(52) U.S. Cl.
USPC .......................................................... 717/105

(58) Field of Classification Search
CPC ......................................................... G06F 8/34
See application file for complete search history.

(56) References Cited

U.S. PATENT DOCUMENTS

| | | | |
|---|---|---|---|
| 2007/0038683 A1* | 2/2007 | Dixon et al. | 707/202 |
| 2010/0251155 A1* | 9/2010 | Shah et al. | 715/771 |
| 2010/0280865 A1* | 11/2010 | Goja | 705/8 |
| 2010/0281462 A1* | 11/2010 | Festa | 717/108 |
| 2010/0305997 A1* | 12/2010 | Ananian et al. | 705/7 |

OTHER PUBLICATIONS

EMC Documentum xCelerated Composition Platform for Business Process Management, EMC Corporation, Feb. 2010.

* cited by examiner

*Primary Examiner* — Philip Wang
(74) *Attorney, Agent, or Firm* — Van Pelt, Yi & James LLP

(57) ABSTRACT

Tools and techniques to develop case management application software are disclosed. In various embodiments, a definition is provided via a visual tool of entities and processes required to be included in a case management workflow. On receiving the definition, a processor is used to generate programmatically, based at least in part on the definition, a model of at least a portion of a case management software application to implement the workflow. The processor is used to generate software code automatically for the case management software application, based at least in part on the model.

18 Claims, 8 Drawing Sheets

CASE MANAGEMENT SOFTWARE DEVELOPMENT

BACKGROUND OF THE INVENTION

Case management processes and applications are used to manage case-based workloads, such as mortgage or other loan applications, court cases or other legal matters, investigations, professional or business license applications, etc. Case management approaches are used to define and provide software applications and/or tools to manage instances of a type of case, each of which may follow its own and potentially different course through one or more possible states, potentially with more than one possible outcome. Typically, human or other decision makers are involved, and decisions made at various stages may result in an instance of a case entering a new state or even returning to a previous state. As a result of this complexity, case management software applications typically take years to develop, as business analysts who are experts in the business processes and requirements involved interact through numerous iterations with software developers who write the software code for the case management application.

BRIEF DESCRIPTION OF THE DRAWINGS

Various embodiments of the invention are disclosed in the following detailed description and the accompanying drawings.

DETAILED DESCRIPTION

Figure 1:
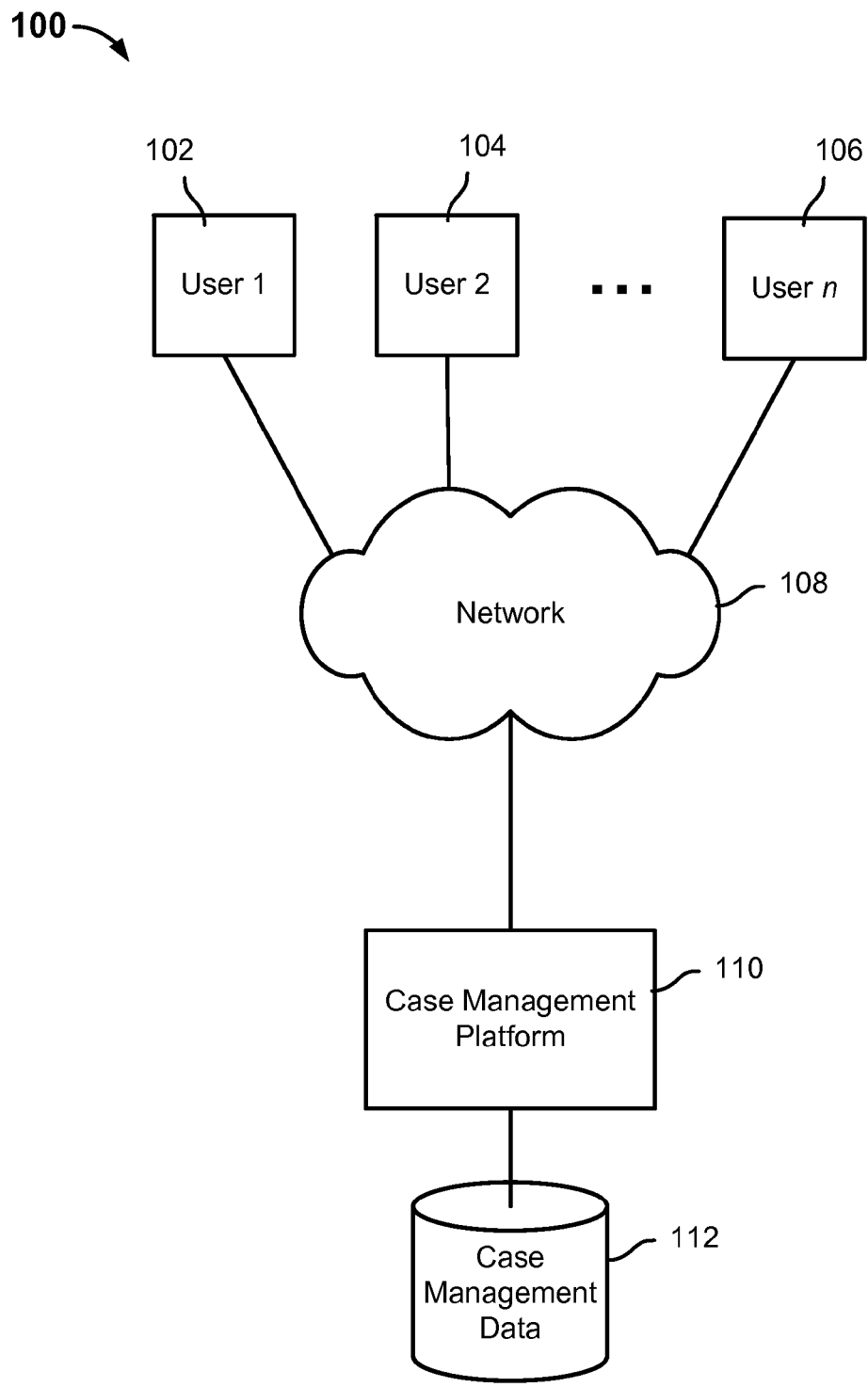
FIG. 1 is a block diagram illustrating an embodiment of a case management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A visual tool to facilitate the development of case management software applications is disclosed. A business analyst or other person knowledgeable about the business processes and requirements for the case management software application uses a visual tool to define and link together the entities and processes needed to be provided for in the case management software application. The input provided via the visual tool is used to generate an application skeleton that models the software components and architecture required for the application. Software developers are tasked with writing code for components, if any, for which code is not yet available. The application skeleton is used to generate programmatically software application code for the case management application. In some embodiments, in addition to the application skeleton, a model is generated to enable a data scientist to understand and be engaged at an early phase of software development in a process of defining the data models, business problems, and expected results desired to be achieve through predictive business analytics processes.

FIG. 1 is a block diagram illustrating an embodiment of a case management system. In the example shown, the case management system and environment 100 includes a plurality of user devices 1 through n, represented in FIG. 1 by devices 102, 104, and 106, which in various embodiments may be laptop or desktop computers, smart phones or other mobile devices, or other client devices. The user devices, represented by devices 102, 104, and 106, connect via network 108 to a case management platform 110. In various embodiments, the network 108 may include on or more of the Internet, an enterprise LAN or WAN, and/or other public and/or private networks. The case management platform 110 runs a case management software application and uses case management data stored in data storage 112 (e.g., a database or other structured or unstructured storage) to manage a plurality of instances of one or more types of case ("case instances"), for example, the respective mortgage loan application files of a plurality of mortgage loan applicants. In various embodiments, case type information is stored in data storage 112 and used by a case management application running on platform 110 to create case instances, for example as new mortgage loan applications are submitted by applicants in the mortgage loan example mentioned above. State information reflecting a current state of each respective case instance is stored in data storage 112 and used by the case management application running on platform 110 to track and update the status of each case instances and to initiate tasks, processing, notifications, and/or other actions necessary to advance each case instance through to completion.

Figure 2:
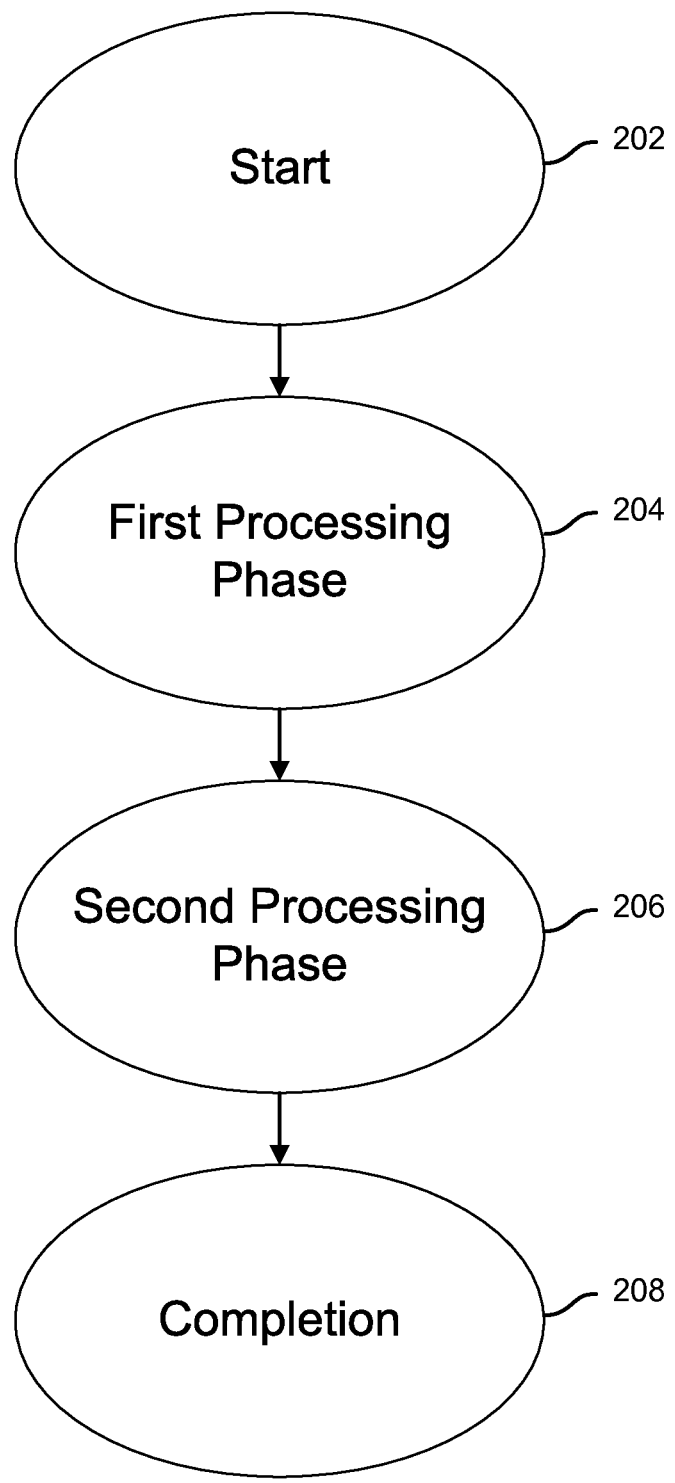
FIG. 2 is a flow diagram illustrating an embodiment of a business process.

FIG. 2 is a flow diagram illustrating an embodiment of a business process. In the example shown, a simple and uniform business process is shown. Each instance of the process proceeds in the same manner and via the same path from a start phase 202, through intermediate processing phases 204 and 206, and finally to a completion phase 208. The business process shown in FIG. 2 lacks much of the complexity of a typical case management workflow, which is more indeterminate in the sense that each case instance may progress through a case management workflow via a different path and potentially entering only a potentially variable subset of possible phases, depending on such factors as business events, internal or external data, and decisions made in various phases by human actors, which may include the generation of ad hoc tasks with variable deadlines, returning to a previous phase or state, skipping a phase or state the case instance might otherwise enter, etc.

Figure 3:
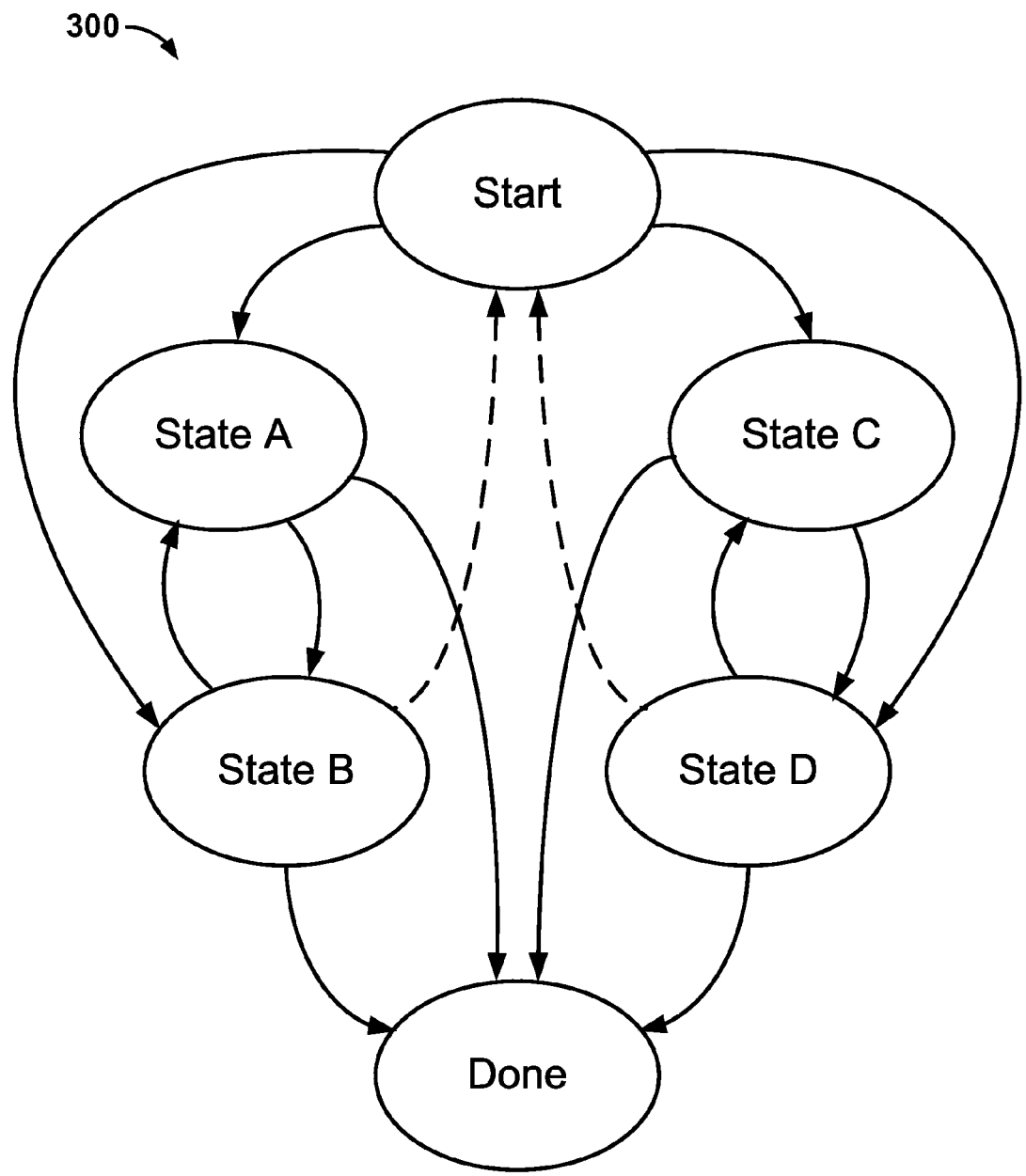
FIG. 3 is a block diagram illustrating an instance of case management workflow.

FIG. 3 is a block diagram illustrating an instance of case management workflow. In the example shown, the case management workflow 300 begins at a start phase and includes a plurality of intermediate phases (A, B, C, and D) along with a wide variety of possible paths through to a completion phase ("done"). As can be seen from FIG. 3, transitions back to phases already entered previously are possible, including transitions all the way back to the start phase. The tangle of possible transitions between phases shown in FIG. 3 begins to give one a sense of the complexity of real life case management workflows, which may have many more possible states and potential transitions between them. For such complex case management workflows, the traditional software development approach typically requires many iterations of having business analysts express business requirements and software developers designing software and providing code to implement a software solution to meet the business requirements.

An automated tool to enable a business analyst, i.e., a person with intimate knowledge of the business requirements that a case management solution must meet but who is not necessarily a software developer, to generate a programmatically implementable model of a case management software application is disclosed. In various embodiments, a visual tool is provided via a graphical user interface, which enables a business analyst to define the artifacts (entities and processes, for example) required to be embodied in a case management application, and their attributes and relationship to other artifacts. Input received via the visual tool is processed to generate programmatically an application skeleton. In various embodiments, the application skeleton comprises a programmatically implementable model to generate automatically software code comprising a case management application that reflects and meets the requirements defined by the business analyst.

Figure 4:
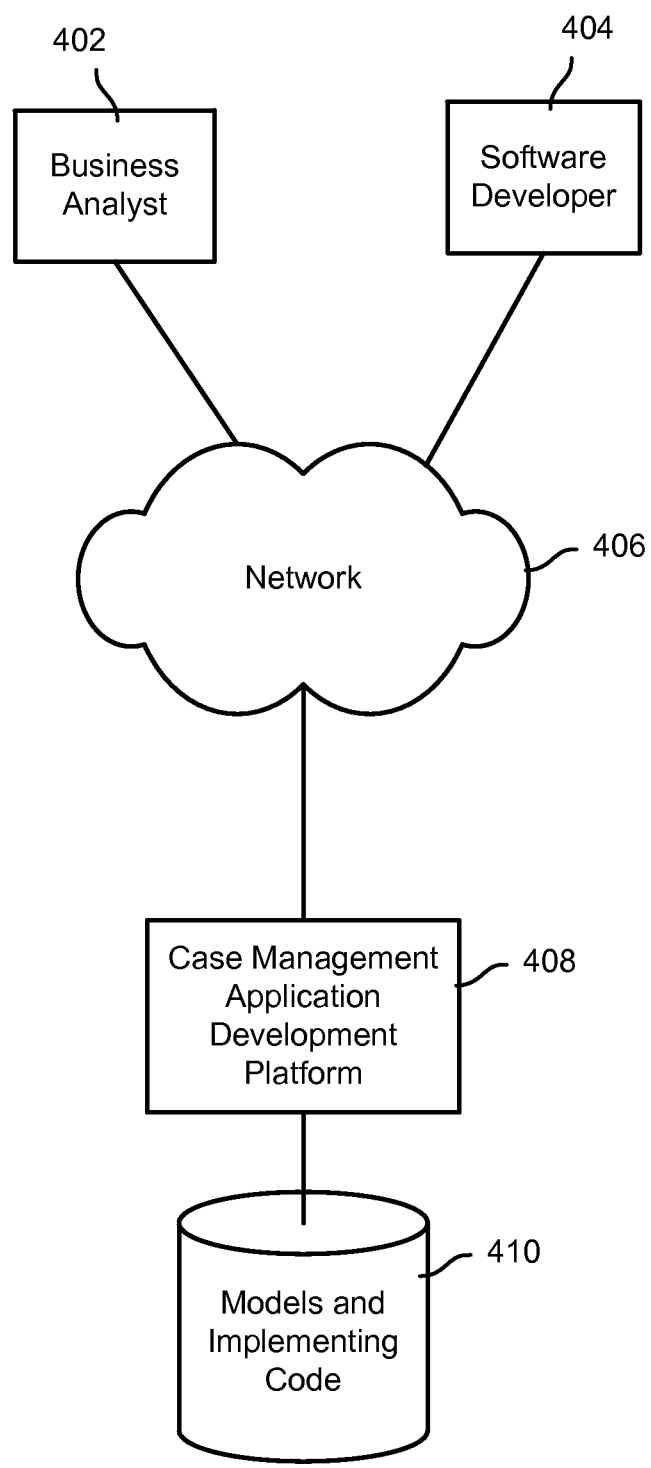
FIG. 4 is a block diagram illustrating an embodiment of a case management application development platform.

FIG. 4 is a block diagram illustrating an embodiment of a case management application development platform. In the example shown, a business analyst or other user uses a business analyst client system 402 to interact via a network 406 with a case management application development platform 408. The platform 408 is configured in various embodiments to provide to the business analyst client system 402 a visual software tool to enable the business analyst to define the business requirements and processes of a case management solution, as disclosed herein. In some embodiments, an interface based on software drawing tools that may be familiar to a user who is not a software developer, such as Microsoft Visio™, may be provided. The visual tool enables the business analyst to define the artifacts (entities and processes) comprising the case management solution, and the relationships between them. The input provided via the visual tool is used to generate and provide to platform 408 an internal representation of the artifacts and relationships that the business analyst has used the visual tool to define. In various embodiments, the internal representations comprises and/or is processed at platform 408 to provide an application skeleton or other model of a case management software application configured to provide the functionality and processing defined by the business analyst. In the example shown, the application model is stored in data storage 410. In some embodiments, the application model comprises one or more component models. Each component model must in the end be implemented by software code comprising the case management application. In the example shown, software code to implement component models is stored in storage 410. If software code corresponding to a component model included in an application model is not yet available in storage 410, in some embodiments a software developer using a software developer client system 404 writes the required code and provides the code to platform 408, via network 406, to be stored in storage 410. In (or once) software code is available for all components included in a case management application model, an automatic code generation process generates code for the case management application, and make the case management application available for testing and deployment.

Figure 5:
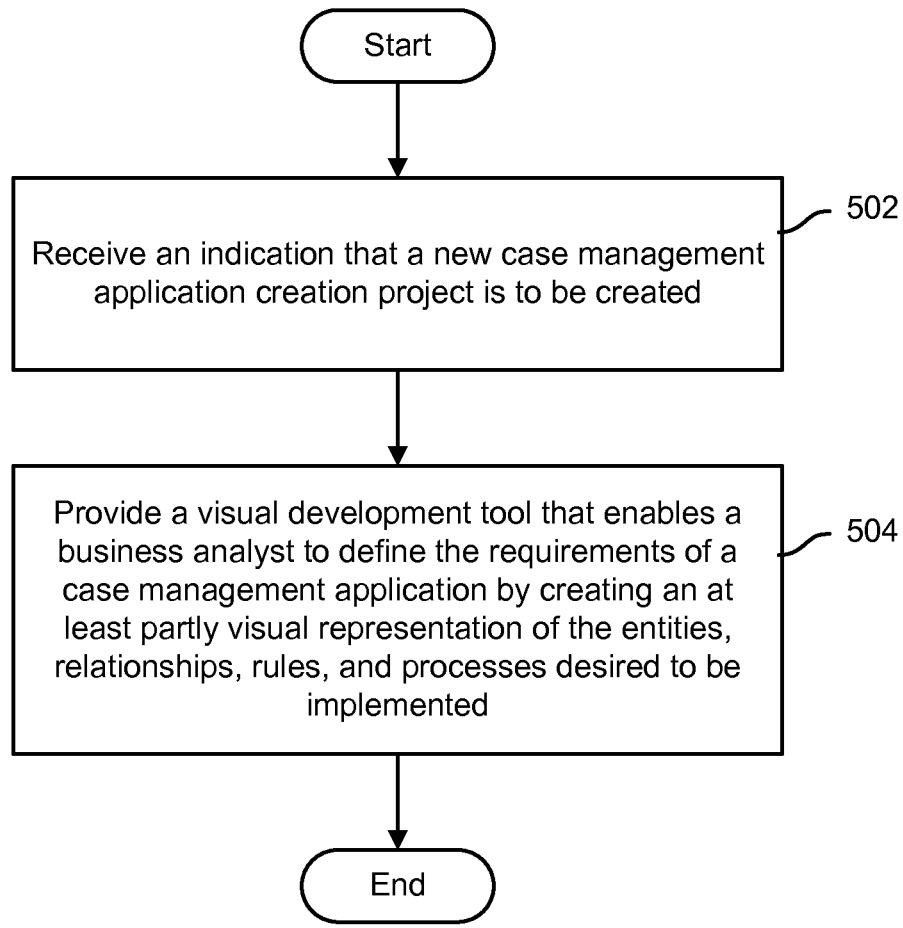
FIG. 5 is a flow diagram illustrating an embodiment of a process to define a case management application.

FIG. 5 is a flow diagram illustrating an embodiment of a process to define a case management application. In the example shown, an indication is received that a new case management solution project is to be created (502). For example, an indication may be received from a business analyst client system, such as client system 402 of FIG. 4. A visual development tool that enables a business analyst to define the requirements of a case management application by creating an at least partly visual representation of the entities, relationships, rules, and processes desired to be implemented is provided (504).

Figure 6:
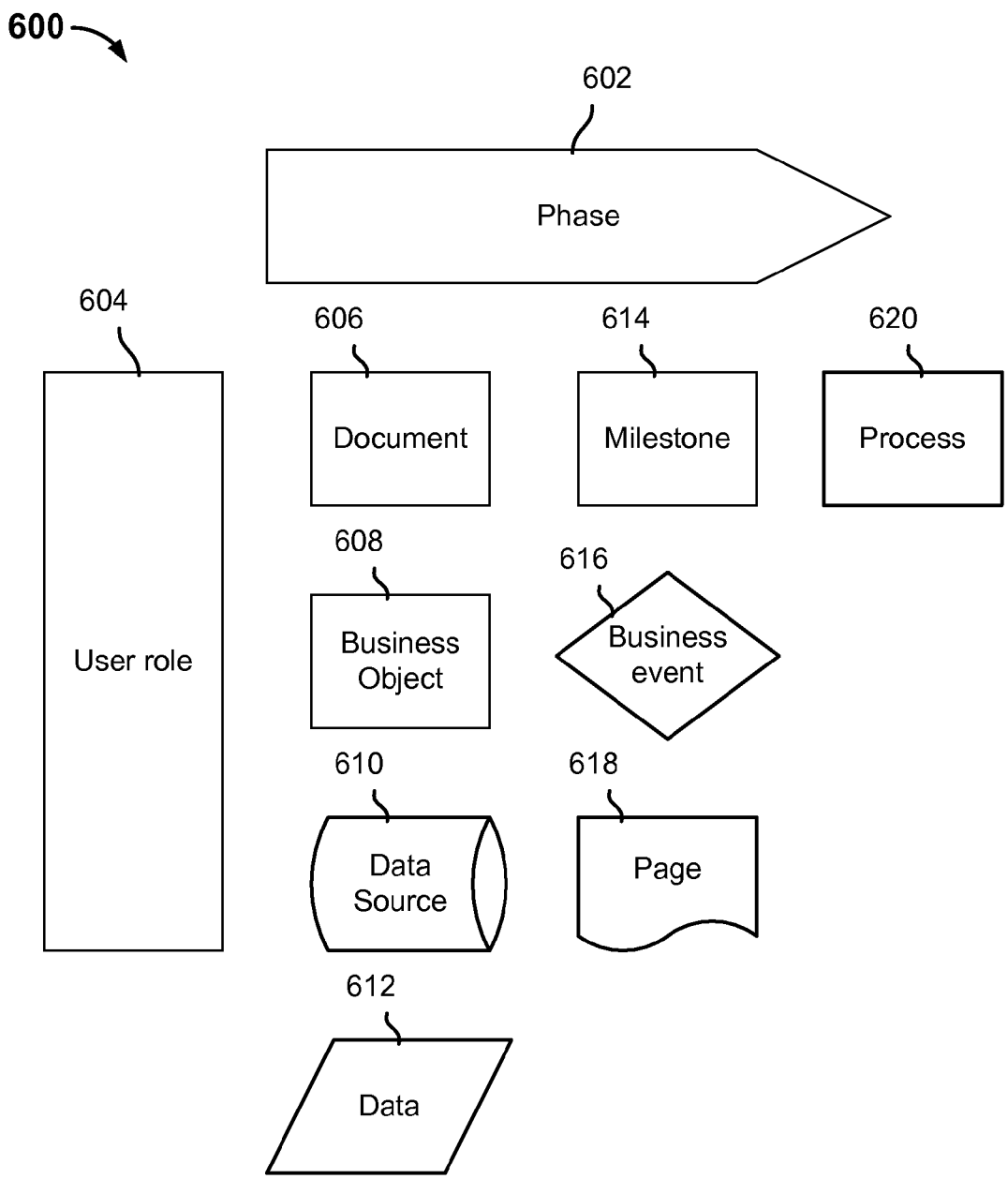
FIG. 6 is a block diagram illustrating an embodiment of a case management application development tool.

FIG. 6 is a block diagram illustrating an embodiment of a case management application development tool. In the example shown, visual tool interface 600 includes a palette of case management application artifacts, each representing a type of artifact that may be included in a visual representation and definition of a desired case management application. In the example shown, the displayed artifact types include a phase type 602 configured to enable one or more phases of a case management workflow to be identified and defined. A user role artifact type 604 enables user roles and their attributes, such as rights and tasks within the workflow, to be defined. Document 606 and business object 608 enable entities comprising one or more of content data and/or methods to be defined. Data source type 610 and data type 612 enable external or internal sources of data, and input or other data itself, to be defined. Milestone type 614 and business event type 616 are used to define milestones and business events that may occur in the course of an case instance, and their respective attributes, such as criteria that must be met for a milestone to be determined to have been achieved or for a business event to have occurred, and for their consequences to be defined, e.g., transition to a new phase 602. A page type 618 enables intermediate or final output, such as a document or display page, to be defined. Finally, a process artifact 620 enables processes to be defined, for example, using a graphical interface to create a flow chart, and/or a declarative or other high level language, as opposed to software code or pseudo-code. In various embodiments, a business analyst selects an artifact type from interface 600 and adds an occurrence of an artifact of that type to a case management application definition, for example by dragging and dropping the graphical representation into a definition portion of a graphical user interface. In some embodiments, double clicking or otherwise selecting and opening an instance of a case management application artifact provides a further interface, such as a structured or other text-based interface, to define attributes of that artifact. Connector objects, not shown in FIG. 6, may be selected from a graphical or other interface in some embodiments to enable relationships between artifacts to be defined visually.

In various embodiments, once a visual tool such as the one shown in FIG. 6 has been used to create a visual representation of a desired case management application, backend processing is performed to use the input received via the visual tool to generate an internal representation of the desired case management application.

Figure 7:
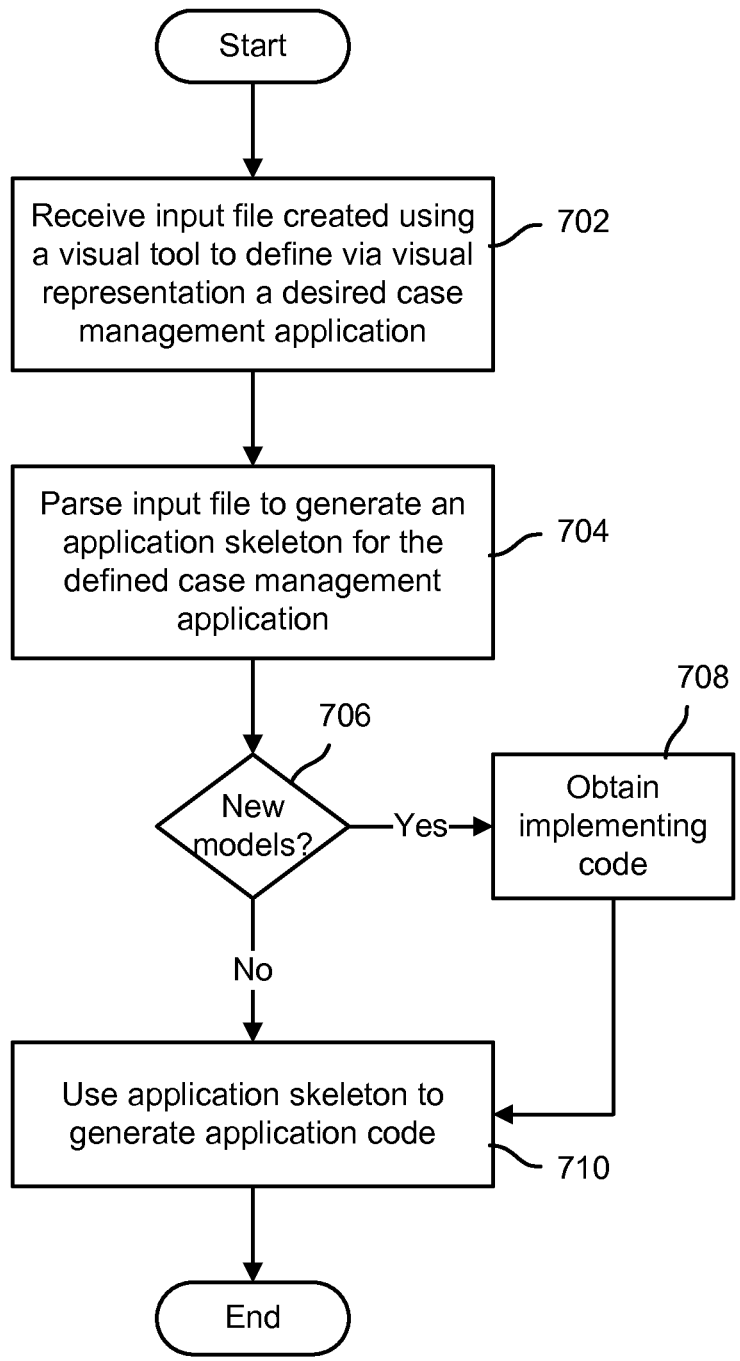
FIG. 7 is a flow diagram illustrating an embodiment of a process to create an internal representation of a desired case management application.

FIG. 7 is a flow diagram illustrating an embodiment of a process to create an internal representation of a desired case management application. In the example shown, an input file created using a visual tool to define via visual representation a desired case management application is received (702). The input file is parsed to generate an application skeleton or other model for the defined case management application (704). If the application skeleton or other model includes component models or other components for which corresponding implementing code is not available (706), then implementing code is obtained from a software developer (708), for example by generating automatically a task to write code to implement the component. Once code is available to implement all components, application code is generated automatically to provide the case management software application (710).

In some embodiments, the visual tool disclosed herein includes artifacts usable to define, integrally with definition of the artifacts comprising the case management workflow and solution, business analytics entities and associated processing. Examples include without limitation artifacts to define a business analytics context; to identify data and sources thereof to be used to perform business analytics processing; to define data simulation and other processing to be performed on data, for example to make or facilitate the making of decisions in particular case instances based at least in part on predictive business analytics; etc.

Figure 8:
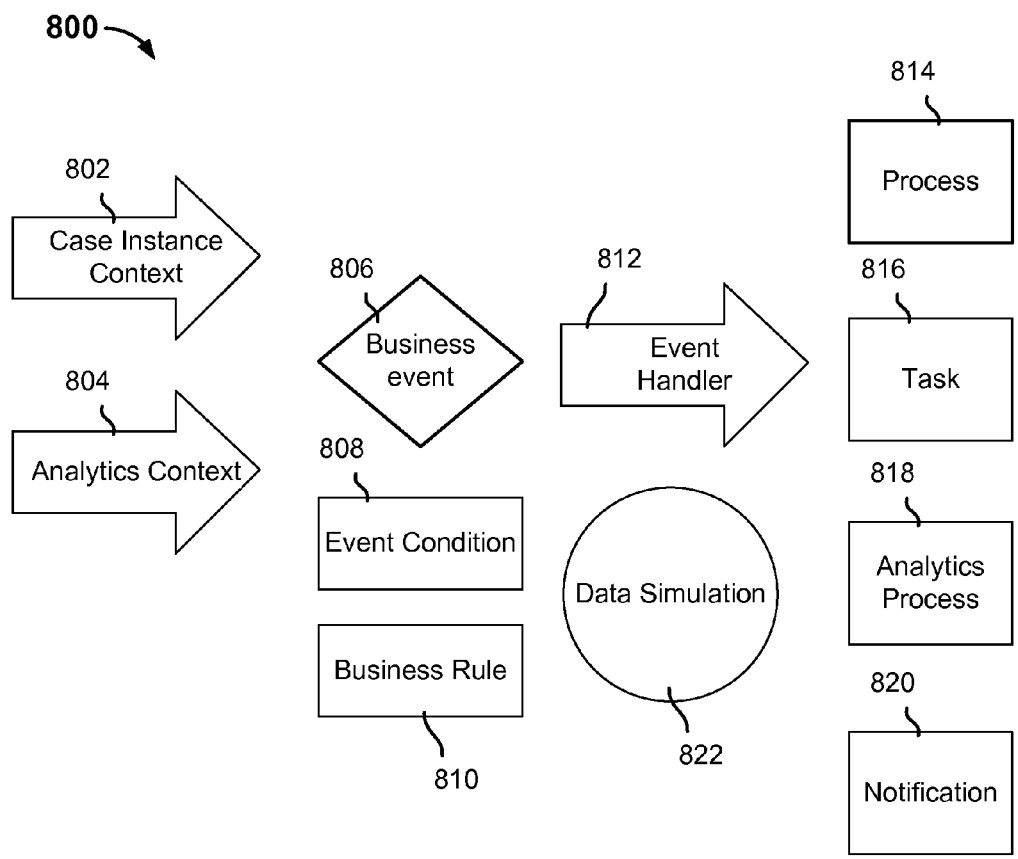
FIG. 8 is a block diagram illustrating an embodiment of a case management application development tool that includes business analytics artifacts.

FIG. 8 is a block diagram illustrating an embodiment of a case management application development tool that includes business analytics artifacts. In the example shown, the interface 800 includes a palette of artifacts that includes business analytics and related artifacts. Case instance context artifact 802 and analytics artifact 804 enable data inputs, including business analytics related inputs, to be identified and defined. A business event artifact 806, event condition 808, and business rule 810 enable business events, the conditions that trigger such events, and the business rules that define and govern what happens upon occurrence of such events, including analytics related consequences and/or other processing, to be defined. An event handler artifact 812 is usable to define an entity to detect the occurrence of a business event and implement processing required to be performed as a consequence, for example as defined by applicable business rules. Artifacts such as processes 814, tasks 816, analytics processes 818, and notifications 820 may be used to define backend processes, tasks to be generated under various circumstances, analytics processing to be performed, and notifications to be generated and sent, to be defined and included in the case management solution in an integrated manner. Finally, data simulations 822 may be defined, and their relationship to other entities such as data, data sources, and analytics processes, to be defined. In this way, a single visual tool enables business analytics entities, requirements, and processes to be defined in parallel and in a fully integrated manner with other case management solution requirements, resulting in a more complete and fully integrated solution, obviating the need for business analysts and data scientists to work separately from the case management software application development process to add a business analytics layer onto the overall case management solution. While inclusion and consideration of business analytics artifacts and requirements is described in some detail with respect to FIG. 8, business analytics development processes and efforts in various embodiments are included and provided for in embodiments such as those described in connection with FIGS. 1 through 7, in some embodiments in the same manner and to the same extent as shown in and described in connection with FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of developing case management software, comprising:
   receiving a definition, provided via a visual tool, of one or more case management application artifacts comprising a case management workflow;
   using a processor to generate programmatically, based at least in part on the definition, a model of at least a portion of a case management software application to implement the workflow, wherein the application model comprises a plurality of software components;
   determining that corresponding software code is not currently available for a first software component comprising the application model;
   automatically generating a task for a developer to provide software code to implement the first software component;
   receiving software code implementing the first software component; and
   in response to receiving software code implementing the first software component, automatically generating application code to provide the case management software application, including by using software code implementing each of the plurality of software components comprising the application model.

2. The method of claim 1, further comprising providing the visual tool.

3. The method of claim 2, wherein the visual tool includes a graphical user interface via which a selection of case management application artifact types is displayed.

4. The method of claim 3, wherein the graphical user interface enables a user to use the selection of case management application artifact types to define entities and processes desired to be included in the case management application.

5. The method of claim 1, wherein the one or more entities and processes include one or more of the following: data; data sources; pages or other output; human user input; documents; business objects; users; user roles; phases; milestones; business events; and processes.

6. The method of claim 1, wherein the definition further includes one or more business analytics artifacts associated with the case management workflow.

7. The method of claim 6, wherein the plurality of software components comprising the application model includes at least one integrated business analytics software component.

8. The method of claim 6, wherein the one or more business analytics artifacts include at least one of the following: artifact defining a business analytics context, artifact identifying data and corresponding data sources, artifact performing business analytics processing, and artifact defining data simulation and processing for predictive analysis.

9. An application development system, comprising:
a processor configured to:
receive a definition, provided via a visual tool, of one or more case management application artifacts comprising a case management workflow;
generate programmatically, based at least in part on the definition, a model of at least a portion of a case management software application to implement the workflow, wherein the application model comprises a plurality of software components;
determine that corresponding software code is not currently available for a first software component comprising the application model;
automatically generate a task for a developer to provide software code to implement the first software component;
receive software code implementing the first software component; and
in response to receiving software code implementing the first software component, automatically generate application code to provide the case management software application, including by using software code implementing each of the plurality of software components comprising the application model; and
a memory or other storage device coupled to the processor and configured to store one or both of the model and the case management software application.

10. The system of claim 9, wherein the processor is further configured to provide the visual tool.

11. The system of claim 10, wherein the visual tool includes a graphical user interface via which a selection of case management application artifact types is displayed.

12. The system of claim 11, wherein the graphical user interface enables a user to use the selection of case management application artifact types to define entities and processes desired to be included in the case management application.

13. The system of claim 9, wherein the definition further includes one or more business analytics artifacts associated with the case management workflow.

14. The system of claim 13, wherein the plurality of software components comprising the application model includes at least one integrated business analytics software component.

15. The system of claim 13, wherein the one or more business analytics artifacts include at least one of the following: artifact defining a business analytics context, artifact identifying data and corresponding data sources, artifact performing business analytics processing, and artifact defining data simulation and processing for predictive analysis.

16. A computer program product to develop software, the computer program product being embodied in a tangible, non-transitory computer readable storage medium and comprising computer instructions for:
receiving a definition, provided via a visual tool, of one or more case management application artifacts comprising a case management workflow;
generate programmatically, based at least in part on the definition, a model of at least a portion of a case management software application to implement the workflow, wherein the application model comprises a plurality of software components;
determining that corresponding software code is not currently available for a first software component comprising the application model;
automatically generating a task for a developer to provide software code to implement the first software component;
receiving software code implementing the first software component; and
in response to receiving software code implementing the first software component, automatically generating application code to provide the case management software application, including by using software code implementing each of the plurality of software components comprising the application model.

17. The computer program product of claim 16, further comprising computer instructions to provide the visual tool.

18. The computer program product of claim 16, wherein the visual tool includes a graphical user interface that enables a user to use the selection of case management application artifact types to define entities and processes desired to be included in the case management application.

* * * * *